United States Patent Office 3,385,890
Patented May 28, 1968

3,385,890
PREPARATION OF DITHIOOXAMIDE
Wilhelm Gruber, Darmstadt, Germany, assignor to Rohm & Haas G.m.b.H., Darmstadt, Germany
No Drawing. Filed Apr. 2, 1965, Ser. No. 445,258
Claims priority, application Germany, Apr. 9, 1964, R 37,654
14 Claims. (Cl. 260—551)

ABSTRACT OF THE DISCLOSURE

An improvement in the preparation of dithiooxamide from hydrogen sulfide and cyanogen in the presence of a basic catalyst which involves carrying out the reaction in a liquid, substantially anhydrous and inert medium.

This invention relates to a novel method of preparing dithiooxamide, also known as rubeane and rubeanic acid, in excellent purity and yield. Dithiooxamide is a compound that is sensitive to water, rapidly turning brown to black in aqueous suspension and even discoloring to a brown under humid conditions. It is known to have utility as an intermediate in the preparation of pharmaceuticals and as an anti-oxidant for stabilizing ascorbic acid and petroleum products.

It is known that dithiooxamide can be prepared by adding hydrogen sulfide to cyanogen as indicated by the equation:

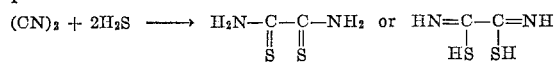

This reaction is accompanied by side reactions of varying intensities depending on the reaction conditions employed, resulting in disappointingly poor yields and impurity of the desired reaction product.

According to Liebig and Wöhler, Annalen der Physik, vol. 24, page 167, and Völckel, Liebig's Annalen, vol. 38, pages 313–314 (1841), cyanogen can be reacted in alcoholic solution with an excess of hydrogen sulfide. V. Battista, Chem. Listy, vol. 37, page 196 (1943), suggested employing an analogous procedure using the initial materials cyanogen and hydrogen sulfide in a molar ratio of 1:10, i.e., an excess of 500% hydrogen sulfide, and ethanol as a solvent.

Following the instructions of the cited authors, it was found that the reaction rate and the yield are both low. For example, when the reaction is performed in a methanol solution, the yield of dithiooxamide is only 35%. When the same reaction is performed in ether, no dithiooxamide can be isolated. It is not surprising, therefore, that these methods have failed to achieve any importance in practice.

U.S. Patent 2,732,401 describes the preparation of dithiooxamide by reacting cyanogen, in an aqueous solution, with sodium hydrogen sulfide, ammonium sulfide, ammonium sulfhydrate or various alkali and alkaline earth sulfhydrates. According to U.S. Patent 2,806,879, dithiooxamide can likewise be prepared by reacting cyanogen and hydrogen sulfide in aqueous solution in the presence of a basic catalyst.

While these prior art suggestions gave promise of producing dithiooxamide in high yields and pure form, rendering expensive purification steps unnecessary, actual results have left much to be desired.

I have found that dithiooxamide is obtainable in especially pure form by reacting, at a temperature between about −20° and about 100° C., preferably at −10° to 30° C., in the presence of a basic catalyst, gaseous cyanogen with gaseous hydrogen sulfide in a liquid, substantially anhydrous (containing at most about 1% water) reaction medium, e.g. an inert organic solvent or mixture of organic solvents for the reactants and the catalyst, until the reaction is substantially complete. It is advantageous to employ the reactants in a substantially stoichiometric ratio, i.e., a molar ratio of about 1:2. Either of the two reactants may be used in excess. Optimum reaction conditions are achieved when cyanogen and hydrogen sulfide are introduced into the solvent simultaneously.

The basic catalyst suitable for use in the process of the invention may vary widely in structure and composition. They include, by way of example, the cyanides, hydroxides, carbonates and lower alcoholates of the alkali metals, especially alkali cyanides, such as potassium cyanide and primary, secondary and tertiary amines, particularly aliphatic amines, having from 1 to 30 carbon atoms. Some of the amines that have been found especially suitable are, for example: n-butylamine, diethylamine, tributylamine, triethylamine, and tripropylamine. The catalyst concentration is not particularly crictical and may range from 0.01% to 10% by weight of the reaction medium. Concentrations of the order of about 0.5 to 3.5% by weight are preferred.

The organic solvents that are suitable for use in the process of this invention are those which are inert to or chemically unreactive with the reactants, the reaction product and the catalyst, capable of dissolving the reactants and the catalyst, and which are liquid under the reaction conditions. Solvents that are particularly suitable include aliphatic and aromatic hydrocarbons, alcohols, ethers, esters, ketones, halogenated hydrocarbons, halogenated alcohols and combinations thereof, e.g., ethyl acetate, benzene, methanol, diethyl ether, acetone and methylene chloride. Alcohols and ketones are preferred when alkali metal-containing catalysts are employed because of the better solubility thereof in these solvents. Although the purity of the reaction product is excellent with all the organic solvents tested, the yield of the reaction product varies somewhat with the solvent employed. It is particularly advantageous to effect the addition of hydrogen sulfide to dicyanogen in methanol or ethyl acetate. As shown by the data for Tests 3 and 6 in the table below, dithiooxamide is obtained directly in yields of 95 to 100% and in practically pure form. The embodiments of the process illustrated in the other example are, however, also adaptable for technical utilization.

The advantages of the method of this invention will become further apparent from the following table of data summarizing the molar amounts of dicyanogen and hydrogen sulfide, the identities and amounts of solvents and catalysts, the reaction time (time taken to introduce the reactants simultaneously into the reaction medium) and temperature, and the percentage of theoretical yield, analyses and appearance of the crude dithiooxamide reaction product in each of thirteen tests. In each test the procedure was to stir a solution of the catalyst in the solvent while simultaneously introducing the gaseous reactants and maintaining the temperature specified. After the reactants had been introduced within the indicated period of time, stirring of the reaction mix was continued for one additional hour, the reaction products was suction-filtered and dried, and the filtrate was allowed to stand for a day to observe any subsequent percipitation.

| Test | Reactants, mol (CN)₂ | Reactants, mol H₂S | Solvent | G. | Catalyst | G. | Reaction Time, min. | Reaction Temp., °C | Percent Theor. Yield | Analysis, percent N | Analysis, percent S | Appearance of Crude Product |
|---|---|---|---|---|---|---|---|---|---|---|---|---|
| 1 | 0.295 | 0.64 | CH₃OH | 99 | nC₄H₉NH₂ | 1 | 30 | −5 | 76.8 | 22.8 | 53.0 | Orange-red. |
| 2 | 0.295 | 0.64 | CH₃OH | 499 | (C₂H₅)₂NH | 1 | 30 | −5 | 83.4 | 22.9 | 53.3 | Do. |
| 3 | 2.065 | 4.48 | CH₃OH | 99 | (C₂H₅)₃N | 5 | 210 | −5 | 100 | 23.3 | | Do. |
| 4 | 0.59 | 1.28 | CH₃OH | 396 | (C₂H₅)₃N | 4 | 60 | 10 to 18 | 82.5 | 23.0 | 53.3 | Do. |
| 5 | 0.59 | 1.103 | CH₃OH | 396 | KCN | 4 | 60 | 15 to 18 | 91.5 | 22.9 | 53.6 | Red-brown. |
| 6 | 0.295 | 0.64 | CH₃COOC₂H₅ | 99 | (C₂H₅)₂NH | 1 | 30 | 5 to 10 | 95.3 | 23.2 | | Orange-red. |
| 7 | 0.295 | 0.64 | CH₃COOC₂H₅ | 99 | (C₂H₅)₃N | 1 | 30 | 10 to 16 | 88.5 | 23.4 | | Do. |
| 8 | 0.295 | 0.64 | CH₃COCH₃ | 99 | (C₂H₅)₂NH | 1 | 30 | 3 to 8 | 62.8 | 23.3 | | Light Orange. |
| 9 | 0.295 | 0.64 | CH₂Cl₂ | 99 | (C₂H₅)₃N | 0.5 | 30 | 3 to 8 | 62.8 | 23.6 | | Do. |
| 10 | 0.295 | 0.64 | C₆H₆ | 99 | (C₂H₅)₃N | 1 | 30 | 10 to 16 | 83.3 | 23.3 | | Do. |
| 11 | 0.59 | 1.18 | Water | 397 | 25N NH₄OH | 2.8 | 60 | 11 to 16 | 78.8 | 22.3 | | Light Brown. |
| 12 | 0.295 | 0.64 | ....do | 99 | (C₂H₅)₂NH | 1 | 30 | 10 to 16 | 51.6 | 22.8 | | Brown. |
| 13 | 0.295 | 0.64 | ....do | 99 | (C₂H₅)₃N | 1 | 30 | 10 to 16 | 65.3 | 22.1 [1] 23.31 | [1] 53.35 | Light Brown. |

[1] Theoretical.

No subsequent precipitation was observable in any of Tests 1 to 11, summarized above. In Tests 12 and 13, however, 7.5 and 4.7 grams, respectively, of subsequent precipitate were found. The after-precipitate of Test 12 was a black substance having a nitrogen content of 14.85%, and that of Test 13 was a sticky, brown-black mass having a nitrogen content of 21.7%.

I claim:

1. A process for preparing dithiooxamide which comprises introducing gaseous cyanogen and hydrogen sulfide into an inert, liquid, substantially anhydrous organic solvent containing between about 0.01% and about 10% by weight, based on the weight of the reaction medium, of a basic catalyst while maintaining the reaction medium at a temperature between about −20° and about 100° C.

2. A process as defined in claim 1 wherein the temperature is maintained at between −10° and +30° C.

3. A process as defined in claim 1 wherein the reaction medium contains between about 0.5 and 3.5% by weight catalyst.

4. A process as defined in claim 1 wherein the organic solvent is methanol.

5. A process as defined in claim 1 wherein the organic solvent is ethyl acetate.

6. A process as defined in claim 1 wherein the organic solvent is acetone.

7. A process as defined in claim 1 wherein the organic solvent is methylene chloride.

8. A process as defined in claim 1 wherein the organic solvent is benzene.

9. A process as defined in claim 1 wherein the catalyst is potassium cyanide.

10. A process as defined in claim 1 wherein the catalyst is diethylamine.

11. A process as defined in claim 1 wherein the catalyst is n-butylamine.

12. A process as defined in claim 1 wherein the catalyst is triethylamine.

13. A process as defined in claim 1 wherein the molar ratio of cyanogen to hydrogen sulfide is about 1:2.

14. A process as defined in claim 1 wherein the cyanogen and hydrogen sulfide are introduced simultaneously into the reaction medium.

References Cited

UNITED STATES PATENTS 2,806,879   9/1957   Kaiser et al.   260—551

CHARLES B. PARKER, *Primary Examiner.*

R. HINES, *Assistant Examiner.*